United States Patent

Bajeli et al.

Patent Number: 6,112,691
Date of Patent: Sep. 5, 2000

[54] DAMPER DEVICE FOR MOORING WATERCRAFT

[75] Inventors: Mario Bajeli; Carlo Pedruzzi, both of Bergamo, Italy

[73] Assignee: GIA. FRA. MA. S.p.A., Italy

[21] Appl. No.: 09/131,449

[22] Filed: Aug. 10, 1998

[30] Foreign Application Priority Data

Sep. 5, 1997 [IT] Italy ................................. MI970642 U

[51] Int. Cl.$^7$ ........................... B63B 21/00; B63B 21/56; F16G 11/00

[52] U.S. Cl. ........................ 114/230.1; 114/247; 114/215; 267/293; 267/294

[58] Field of Search ............................ 114/230.1, 230.2, 114/230.22, 230.25, 230.26, 230.27, 251, 242, 213, 215, 216, 247; 267/81, 292, 293, 294, 73

[56] References Cited

U.S. PATENT DOCUMENTS

| 3,645,225 | 2/1972 | Lunde | 114/235 R |
| 4,559,890 | 12/1985 | Regalbuto et al. | 114/230 |
| 5,524,566 | 6/1996 | Rapa et al. | 114/230 |

*Primary Examiner*—S. Joseph Morano
*Assistant Examiner*—Patrick Craig Muldoon
*Attorney, Agent, or Firm*—Steinberg & Raskin, P.C.

[57] ABSTRACT

A damper device for mooring watercraft, of the type comprising at least two rigid elements (1, 2), to one end of each of which there can be secured a mooring rope or chain, said elements being able to move coaxially in opposition to each other against the action of an elastic body (3) which comprises at least one member (10) constructed of an elastically deformable material.

10 Claims, 1 Drawing Sheet

DAMPER DEVICE FOR MOORING WATERCRAFT

FIELD OF THE INVENTION

This invention relates to a damper device for mooring watercraft in accordance with the pre-characterising part of the main claim.

BACKGROUND OF THE INVENTION

In known devices of the aforesaid type the elastic element consists simply of a spring. The main drawback of known devices is their noise. In this respect the rolling movement of the watercraft results in continuous stressing of the device, with consequent stressing of the spring which in extending or compressing to return to its rest position produces a very annoying noise. It is well known that an extending spring is easily subject to yielding and, in the limit, to breakage due to excess load. In the aforesaid known devices with an extending spring, this drawback is obviated or at least limited by the addition of a by-pass safety chain which however, when in operation, eliminates the damping effect with the inevitable consequence that impact forces arise.

It should also be noted that as said devices are constructed completely of rigid materials, they can cause damage to the bottom of the watercraft by bruising and/or rubbing during mooring and during pulling-in of the mooring line or chain. In addition, known devices have an "open" structure and are therefore completely exposed to the water which, particularly if sea-water, deteriorates the device components and especially the elastic element. In this respect with the passage of time this latter, because of the action of the water, tends to rust and/or become less elastic. This on the one hand causes a further increase in the noise of the device and on the other hand results in lower device efficiency.

OBJECTS AND SUMMARY OF THE INVENTION

An object of this invention is to provide a damper device for watercraft which obviates the aforesaid drawbacks, particularly by not being noisy and by providing excellent resistance to deterioration effects caused by water.

These and further objects which will be apparent to an expert of the art are attained by a device in accordance with the characterising part of the main claim.

BRIEF DESCRIPTION OF THE DRAWINGS

The invention will be more apparent from the accompanying drawing, which is provided by way of non-limiting example and on which.

DETAILED DESCRIPTION TO THE PREFERRED EMBODIMENTS

Figure 1:
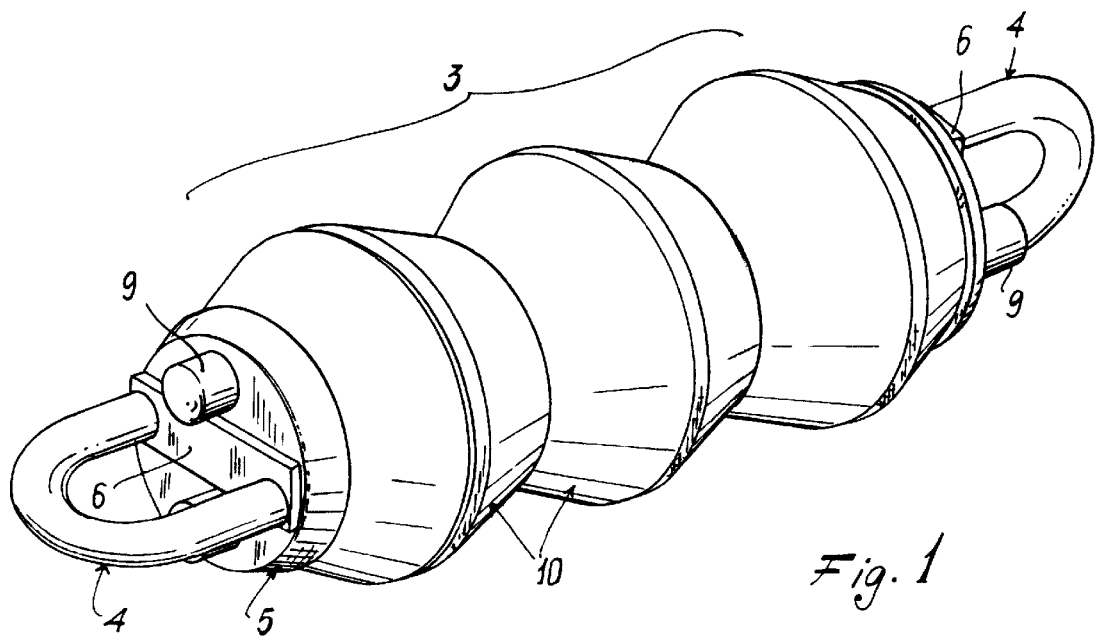
FIG. 1 is a perspective schematic view of the device.
Figure 2:
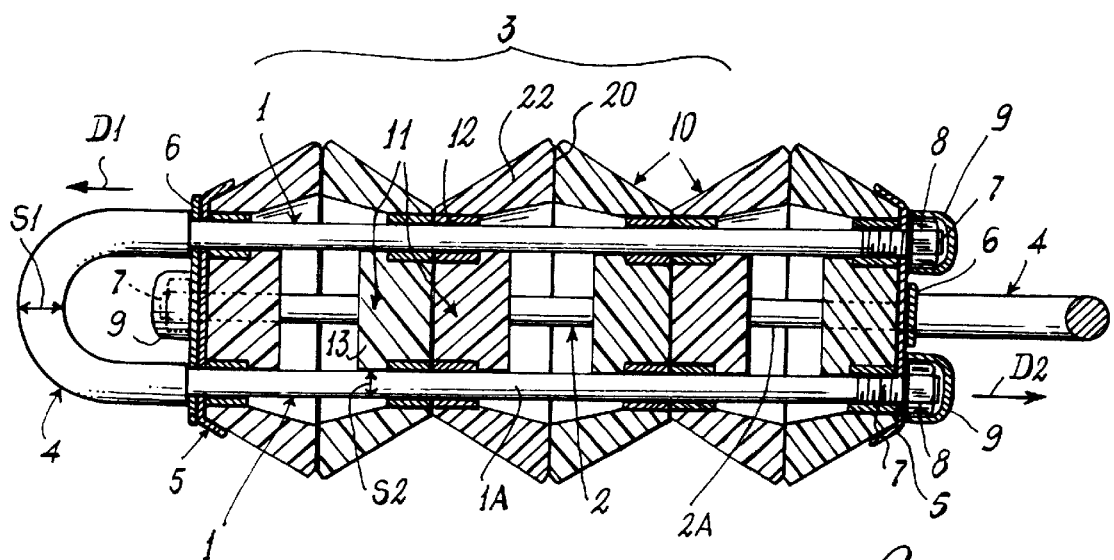
FIG. 2 is a schematic longitudinal section therethrough.

With reference to said figures, a device according to the invention comprises two U-bent elements 1 and 2, and a central elastic body 3 arranged to oppose the movement of the two elements 1, 2 in the opposing directions D1 and D2 respectively. In correspondence with their U-bent head 4 the rigid elements 1 and 2 comprise a disc 5 acting as an abutment for the elastic body 3, and having four equidistant holes for passage of the arms 1A, 2A of the elements 1 and 2.

Advantageously, the head 4 has a diameter S1 greater than the diameter S2 of the arms 1A, 2A. Furthermore, between the head 4 and the disc 5 there is fixed a spacer and stiffening bar 6. The free ends of the arms 1A, 2A have a threaded portion 7 to receive a nut 8 on which a protection cap 9 can be pressure-mounted.

In the illustrated example, the central elastic body 3 comprises six hollow, frusto-conical, circular-based members 10 of elastic plastic material open at their major base. In their minor base 11 these members comprise four equidistant holes for passage of the arms 1A, 2A. To facilitate sliding of the arms, plastic bushes 12 are provided in these holes to prevent the arms 1A, 2A making contact with the material of the members 10. At the centre of the inner face of the minor base 11, the members 10 comprise a cross-shaped stiffening part 13 provided along the diameters connecting together the passage holes for the arms 1A, 2A. The circular based members having a major base portion 20 and a minor base portion 11, and a frusto-conical portion 22 extending between the major base portion 20 and the minor base portion 11. The frusto-conical portions 22 of each of circular based members extends outwardly from and beyond the perimeter of the rigid elements upon axial compression of head 4 thereby providing a dampening effect.

Advantageously the rigid elements 1 and 2, the discs 5, the bars 6, the nuts 8 and the caps 9 are constructed of stainless steel, whereas the members 10 can be constructed of any known deformable material suitable for the purpose, preferably rubber having a Shore hardness of between 50 and 90 and maintaining its characteristics unaltered within a temperature range of −30° C. to +80° C.

It should be noted that when the device is assembled the elastic body 3 is sealedly clamped against the discs 5, hence the central part of the device is isolated from the water.

It has been shown experimentally that the device is totally silent while providing a performance substantially similar to that of traditional devices.

Finally it should be noted that the aforedescribed embodiment is provided by way of example and that numerous modifications are possible all falling within the same inventive concept, for example the number and/or form of the members 10 could be different from that described, as could the number and form of the elements 1 and 2 to which the mooring lines are connected.

We claim:

1. A damper device for mooring watercraft comprising:

at least two rigid elements movable in an axial direction with respect to each other, each of said at least two rigid elements having a head portion and an arm portion;

a central body made from an elastically deformable material, said central body comprising a plurality of hollow frusto-conical elastic members, each elastic member having a major base portion and a minor base portion, and a frusto-conical portion extending between said major and minor base portions, said major base portion being open and said minor base portion comprising a plurality of uniform and equidistant holes, said arm portions of said rigid elements longitudinally extending through said central body and passing through said holes of said minor base portions of elastic members respectively, said arm portions being slidably movable therethrough, said frusto-conical portions of each of said elastic members extending outwardly from and extending beyond a perimeter of said rigid elements upon axial compression of said head portion of said at least two rigid elements thereby providing a dampening effect.

2. The damping device as claimed in claim 1, wherein said elastically deformable material is plastic.

3. The damping device as claimed in claim 1, wherein said minor base portion further comprises a tubular element disposed around said arm portion and located in said holes, said tubular element facilitating the sliding of said arms.

4. The damping device as claimed in claim 1, wherein said head portion of said at least two rigid elements is U-shaped having an end thereof, said at least two rigid elements further comprising discs abutting said central body.

5. The damping device as claimed in claim 4, wherein said head portion has a diameter greater than a diameter of said arm portion.

6. The damping device as claimed in claim 1, wherein said members further comprise a stiffening wall in communication with said minor base portion.

7. The damping device as claimed in claim 1, wherein said major base portions of adjacent pairs of elastic members are in facing contacting relationship with each other.

8. A damping device for mooring watercraft, comprising:
at least two rigid elements movable in an axial direction with respect to each other, each of said at least two rigid elements having a head portion and an arm portion;
a central body, said central body comprising a plurality of elastic members, each elastic member having a major base portion, a minor base portion and a frusto-conical portion, said minor base portion comprising a plurality of holes,
said arm portion longitudinally penetrating said central body passing through said elastic members via said holes in said minor base portions thereof and said arm portion is slidably movable therethrough,
said frusto-conical portion of each elastic member flexing upon axial compression of said head portion of said at least two rigid elements thereby providing a dampening effect.

9. A damper device for mooring watercraft comprising:
at least two rigid elements movable in an axial direction with respect to each other, each of said at least two rigid elements having a head portion and an arm portion;
a central body made from an elastically deformable material, said central body comprising a plurality of elastic members each comprising a plurality of holes;
said arm portions of said rigid elements longitudinally extending through said central body and passing through said holes of said elastic members respectively, said arm portions being slidably movable therethrough; and
said elastic members extending outwardly from and extending beyond a perimeter of said rigid elements upon axial compression of said head portion of said at least two rigid elements thereby providing a dampening effect.

10. A damping device for mooring watercraft, comprising:
at least two rigid elements movable in an axial direction with respect to each other, each of said at least two rigid elements having a head portion and an arm portion;
a central body, said central body comprising a plurality of elastic members each comprising a plurality of holes;
said arm portion longitudinally penetrating said central body passing through said elastic members via said holes, said arm portion being slidably movable therethrough; and
said elastic member flexing upon axial compression of said head portion of said at least two rigid elements thereby providing a dampening effect.

* * * * *